US011113729B2

(12) United States Patent
Lidow et al.

(10) Patent No.: US 11,113,729 B2
(45) Date of Patent: Sep. 7, 2021

(54) REAL-TIME ONLINE ADVERTISEMENT TYPE OVERRIDES

(71) Applicant: AppNexus, Inc., New York, NY (US)

(72) Inventors: Arel Ives Lidow, New York, NY (US); Scott Daniel Menzer, Randolph, NJ (US); Michael William Stevenson McNeeley, Brooklyn, NY (US)

(73) Assignee: Xandr Inc., New York, NY (US)

( * ) Notice: Subject to any disclaimer, the term of this patent is extended or adjusted under 35 U.S.C. 154(b) by 808 days.

(21) Appl. No.: 14/745,884

(22) Filed: Jun. 22, 2015

(65) Prior Publication Data

US 2016/0371746 A1    Dec. 22, 2016

(51) Int. Cl.
*G06Q 30/02*    (2012.01)

(52) U.S. Cl.
CPC ................ *G06Q 30/0275* (2013.01)

(58) Field of Classification Search
None
See application file for complete search history.

(56) References Cited

U.S. PATENT DOCUMENTS

| 9,177,333 | B2 * | 11/2015 | Sinyagin | G06Q 30/0273 |
| 10,915,232 | B1 * | 2/2021 | Bowser | H04L 67/02 |
| 2003/0028618 | A1 * | 2/2003 | Currans | H04L 67/16 |
| | | | | 709/218 |
| 2006/0069613 | A1 * | 3/2006 | Marquardt | G06Q 30/02 |
| | | | | 705/14.47 |
| 2007/0257938 | A1 * | 11/2007 | Steinbock | G06T 19/20 |
| | | | | 345/619 |
| 2008/0103896 | A1 * | 5/2008 | Flake | G06Q 30/02 |
| | | | | 705/14.43 |
| 2009/0063278 | A1 * | 3/2009 | Song | G06Q 30/00 |
| | | | | 705/14.69 |

(Continued)

OTHER PUBLICATIONS

Goldfarb, Avi, and Catherine Tucker. "How do advertising standards affect online advertising?." Working paper,[http://server1.tepper.cmu.edu/Seminars/docs/SSRN-id1745645.pdf, consulté le Jun. 15, 2012], 2011. (Year: 2011).*

(Continued)

*Primary Examiner* — Michael Bekerman
*Assistant Examiner* — Scott Snider
(74) *Attorney, Agent, or Firm* — Guntin & Gust, PLC; Mark Wilinski

(57) ABSTRACT

Methods, systems, and apparatus, including computer programs encoded on a computer storage medium, for receiving, from a client device, a first notification of an ad space from a seller, identifying ad conditions corresponding to an ad space inventory to which the ad space belongs comprising a first condition that identifies an allowed creative media type for the ad space inventory, sending a second notification requesting a bid on the ad space to bidders, each bidder representing a respective buyer, receiving bids from the bidders, each bid corresponding to a respective bid price, buyer, and a creative, determining that a first bid of the bids corresponds to a first creative having a media type different from the allowed creative media type, and identifying a preexisting arrangement between the buyer corresponding to the first bid and the seller and, based thereon, allowing the first creative to be served to the ad space.

20 Claims, 3 Drawing Sheets

(56) References Cited

U.S. PATENT DOCUMENTS

| | | | | |
|---|---|---|---|---|
| 2010/0262498 A1* | 10/2010 | Nolet | ................ | G06Q 30/0276 705/14.71 |
| 2010/0293063 A1* | 11/2010 | Atherton | ................ | G06Q 30/02 705/14.73 |
| 2011/0231264 A1* | 9/2011 | Dilling | ................... | G06Q 30/02 705/14.71 |
| 2014/0279052 A1* | 9/2014 | Demsey | ............. | G06Q 30/0275 705/14.71 |
| 2015/0051968 A1* | 2/2015 | Sotelo | ................ | G06Q 30/0246 705/14.45 |

OTHER PUBLICATIONS

Kumar, Subodha, Varghese S. Jacob, and Chelliah Sriskandarajah. "Scheduling advertisements on a web page to maximize revenue." European journal of operational research 173.3 (2006): 1067-1089. (Year: 2006).*

* cited by examiner

REAL-TIME ONLINE ADVERTISEMENT TYPE OVERRIDES

BACKGROUND

This specification relates to online advertising and, more particularly, real-time advertisement auctions.

Online display advertising delivers promotional messages to consumers by using visual advertisements (or "ads") in web pages. A publisher of a web page can insert an ad space in a web page. An ad space is a region of a web page (or other electronic document) where an advertisement can be placed. When the web page is displayed in a browser, a visual advertisement (a "creative") of an advertiser can be dynamically retrieved from an ad server for the advertiser, and displayed in the ad space. The act of serving a creative on a web page for displaying is often referred to as an impression.

An ad space inventory is a collection of one or more ad spaces on web pages served by a publisher's web sites. Publisher can sell their ad space inventories to advertisers. Multiple publishers and multiple advertisers can participate in auctions in which selling and buying of ad space inventories take place. Auctions can be conducted by an ad network or ad exchange that brokers between a group of publishers and a group of advertisers.

Selling and buying ad spaces can be based on pricing or payment models such as cost per thousand impressions (CPM), cost per click (CPC), and cost per action or acquisition (CPA). In the CPM model, advertisers typically pay for every impression of their advertisement; the price paid for each impression is measured in price per 1000 ("mille") impressions. In the CPC model, advertisers typically pay each time a viewer clicks on their advertisement. In the CPA model, advertisers pay for every action, such as a sale or registration, completed as a result of a viewer clicking on their advertisement.

SUMMARY

In general, one aspect of the subject matter described in this specification can be embodied in methods that include the actions of receiving, from a client device, a first notification of an ad space from a seller, the ad space being for presentation in a user interface of an application executing on the client device; identifying a plurality of ad conditions corresponding to an ad space inventory to which the ad space belongs comprising a first condition that identifies an allowed creative media type for the ad space inventory; sending a second notification requesting a bid on the ad space to a plurality of bidders, each bidder representing a respective buyer; receiving bids from the bidders, each bid corresponding to a respective bid price, buyer, and a creative; determining that a first bid of the bids corresponds to a first creative having a media type different from the allowed creative media type; and identifying a preexisting arrangement between the buyer corresponding to the first bid and the seller and, based thereon, allowing the first creative to be served to the ad space. Other embodiments of this aspect include corresponding systems, apparatus, and computer programs.

These and other aspects can optionally include one or more of the following features. Allowing the first creative to be served to the ad space can further comprise identifying a second condition of the plurality of ad conditions; and determining that one or more attributes of the first creative satisfies the second condition and, based thereon, allowing the first creative to be served to the ad space. The second condition can specify one or more requirements for creative dimensions, creative content type, creative content language, creative landing page, buyer, or brand. The second condition can specify creative dimensions and can be satisfied if a size of the first creative fits within the creative dimensions. The second condition can specify allowed one or more creative content types and can be satisfied if a content type of the first creative belongs to the allowed creative content types. The second condition can specify one or more allowed creative content languages and can be satisfied if a content language of the first creative belongs to the allowed specified creative content languages. The second condition can specify one or more allowed landing pages and can be satisfied if a landing page of the first creative belongs to the allowed landing pages. The second condition can specify one or more allowed buyers and can be satisfied if a buyer of the first creative belongs to the allowed buyers. The second condition can specify one or more allowed brands and can be satisfied if a brand of the first creative belongs to the allowed brands. Allowing the first creative to be served to the ad space can further comprise determining that a bid price of the first bid meets a floor price corresponding to the preexisting arrangement and, based thereon, allowing the first creative to be served to the ad space. The floor price can be based on a media type of the first creative. The preexisting arrangement can be specified for at least the ad space inventory to which the ad space belongs.

Particular implementations of the subject matter described in this specification can be implemented to realize one or more of the following advantages. The system described herein provides a real-time ad space auction based on creative media type. The system conducts an auction on an available ad space from a seller and receives bids from respective buyers. For a highest bid from a particular buyer, the system determines whether the highest bid's creative has a media type that is allowed for the ad space. If the highest bid's creative has a media type different from the allowable media type, the system automatically allows the highest bid's creative to be served to the ad space when the particular buyer has a preexisting agreement with the seller. In addition, the system determines whether the highest bid's bid price meets a minimal price specified by the preexisting agreement. In this way, the seller can ask for a premium (the minimal price) for a creative with a media type different from the allowable media type.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
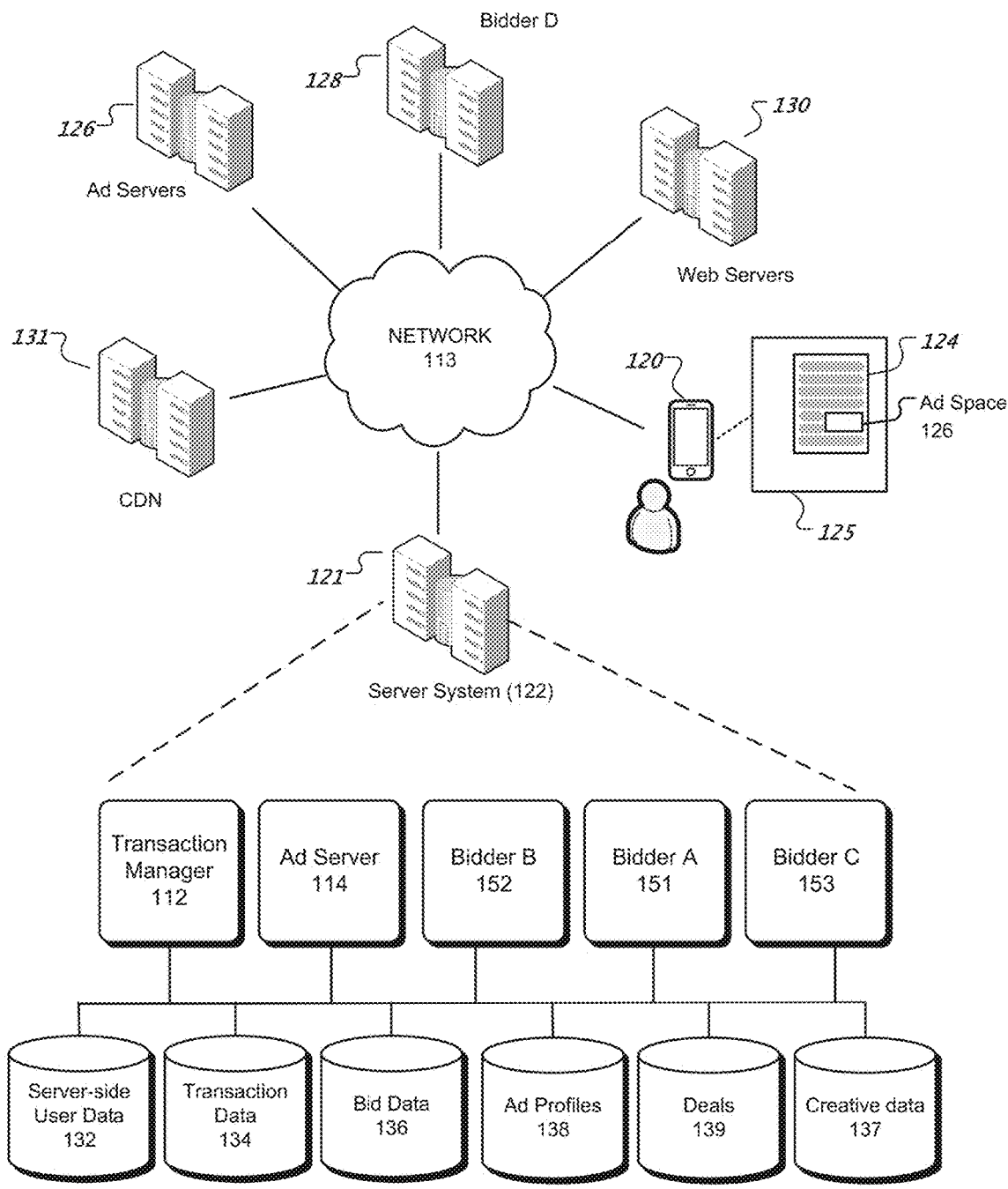
FIG. 1 illustrates an example system for real-time online ad auction based on creative media type.

FIG. 1 illustrates an example system for real-time online ad auction based on creative media type. A server system 122 provides functionality for real-time online ad space auction. The server system 122 comprises software components and databases that can be deployed at one or more data centers 121 in one or more geographic locations, for example. The server system 122 software components comprise a transaction manager 112, ad server 114, and one or more bidders (e.g., bidder A 151, bidder B 152, and bidder C 153). The server system 122 can also include one or more software components for load balancing tools and security tools. The load balancing tools manage traffic within a single data center or between multiple data centers. The security tools manage data protection and access privilege for tenants served by the data centers 121. The software components can comprise subcomponents that can execute on the same or on different individual data processing apparatus. The server system 122 databases comprise a server-side user data database 132, transaction data database 134, bid data database 136, creative data database 137, ad profiles database 138, and deals database 139. The databases can reside in one or more physical storage systems. The software components and databases will be further described below.

The transaction manager 112 ("impression bus" or simply "Imp Bus") is a software component that facilitates the transaction aspects of ad space inventory trading between buyers and sellers. A buyer can be an advertiser (e.g., a credit card company, a sportswear company), an ad network, or an advertising agency. Other buyers are possible. A seller can be a publisher (e.g., newspaper or social network), an online streaming or gaming service, or an ad network. Other sellers are possible. The transaction manager 112 processes ad requests received from web browsers or other software applications displaying content from publishers, send relevant information to advertisers, conducts auctions (e.g., on behalf of sellers), returns creatives to the browsers or other applications, keeps track of billing and usage for advertisers and publishers, returns auction-result data, and enforces quality standards, for example. The transaction manager 112 stores in the transaction data database 134 various transaction information for each ad space that is transacted by the transaction manager 112 or other software components of the server system 122.

The ad server 114 is a software component that serves creatives to web pages. The ad server 114 can also make decisions about what creatives to serve, and track clicks or other user interactions with creatives, for example.

A bidder (e.g., bidder A 151) is a software component that, on behalf of a buyer, performs bidding operations. The bidder takes various pieces of bid-specific information (e.g., maximal bid price, target user areas or segments, start and end dates, budget) as input and generates a bid for a particular item of an ad space inventory, for example. The bidder may store bid-specific information in bid data database 136. In some implementations, a bidder can be remote from the server system 122, such as bidder D 128.

The transaction manager 112 can conduct an auction when receiving an ad request for filling an available ad space. By way of illustration, a user interface 124 of an application 125 executing on a user's client device 120 can include an ad space 126 and a corresponding ad tag. For instance, a web page displayed in a browser window of a web browser (e.g., running on a personal computer) can include an ad space on the web page and a corresponding ad tag. By way of illustration, the ad space can appear at the bottom of the user interface (a "banner ad") with a corresponding ad tag. Other examples of ad spaces are possible. Here, the user's client device 120 can be a mobile phone, a smartwatch, a tablet computer, a personal computer, a game console, or an in-car media system. Other examples of a client device are possible.

In some implementations, an ad tag comprises a Uniform Resource Locator (URL) from which an ad will be requested (e.g., a URL for the server system 122), Hypertext Markup Language (HTML) statements and/or JavaScript instructions for retrieving and displaying a creative (e.g., displaying the creative in a 160×600 iframe). The application 125 running on the user's client device 120 can retrieve content in the user interface 124 (e.g., a web page) through one or more data communication networks 113 such as the Internet, for example, from web servers 130 of a publisher. The ad tag causes the application 125 to send (e.g., through the networks 113) a notification or an ad request to the server system 122. The ad request can include information about the available ad space 126 (e.g., a size for the ad space, an identifier for the publisher), user information (e.g., an identifier of the user, an IP address), and system information (e.g., types of the browser and the client device), for example.

In response to the ad request, the transaction manager 112 can access a server-side user data database 132 based on the user's identifier (if available), and retrieve available information about the user (e.g., user segment information such as age, gender, interests, or location). The transaction manager 112 generates a bid request including information about the ad space, the user, and so on, and sends the bid request to multiple bidders such as bidder A 151 and bidder B 152. The transaction manager 112 can also send the bid request through the networks 113 to servers of bidder D 128, which is external to the server system 122.

Each bidder determine an appropriate bid based on its own requirements (e.g., budget, targets in placements or user demographics) and submit a bid response including a bid price and an identifier of a creative to be served, for example, to the transaction manager 112 (or not to respond at all). The transaction manager 112 determines a winning bid (e.g., a highest bid) among bid responses received within a specified time period (e.g., 10 milliseconds). The transaction manager 112 then returns a creative of the winning bid to the user's client device 120, causing the application 125 to display the creative in the ad space in the user interface 124. The transaction manager 112 can also return a URL for a creative of the winning bid to the user's client device 120, causing the application 125 on the client device 120 to retrieve the creative from an ad server (e.g., ad server 114, or ad servers 126 external to the server system 122), or from servers of a content distribution network (CDN) 131. In various implementations, the transaction manager 112 can store in the transaction data database 134 transaction information such as an identifier of the creative served to the user, an identifier of the winning buyer, the user's identifier, the winning bid price, an identifier of the ad space, an identifier of the seller of the ad space, and a time stamp. Other transaction information of a transaction is possible.

To ensure better user experience, a seller (e.g., a publisher or an ad network) can create an ad quality profile ("ad profile") specifying one or more quality standards or conditions that allow or prohibit a creative to be served to ad spaces of an ad space inventory of the seller. A creative can be served to an ad space of the ad space inventory if the creative satisfies the conditions specified by the ad profile. Conditions specified in an ad profile can be based on one or more attributes of a creative such as creative media type, dimensions, content type, content language, landing page, buyer, and brand, for example. An ad profile for an ad space inventory can specify conditions in allowed or prohibited attributes of creatives to be served to ad spaces of the ad space inventory. A creative can be served to an ad space of the ad space inventory if the creative has attributes that belong to the allowed attributes (and do not belong to the prohibited attributes).

An ad profile can specify creative content types that are allowed or prohibited for ad spaces of an ad space inventory. For instance, prohibited content types can be related to illegal or questionable subjects (e.g., gambling, misappropriation of copyright material) or actions (e.g., executing or downloading files without user interaction).

An ad profile can specify one or more creative media types that are allowed for ad spaces in an ad space inventory. Creative media types can be image (e.g., a still image with fixed dimensions) or rich-media. The rich-media creative media type includes expandable (e.g., an image expandable in size), animation, video, and audio. If a creative's media type does not belong to the allowed creative media types specified by the ad profile, the creative cannot to be served to ad spaces in the ad space inventory.

An ad profile can specify creative dimensions for each ad space in an ad space inventory. For instance, creative dimensions for an ad space in the ad space inventory can be the same as (or within plus ten percent from) the ad space's dimensions. A creative is allowed to be served to the ad space if the creative's dimensions can fit within the specified creative dimensions.

An ad profile can specify one or more creative content languages (e.g., English and Spanish) that are allowed for ad spaces in an ad space inventory. A creative can be served to ad spaces of the ad space inventory if the creative's content language belongs to the allowed creative content languages.

An ad profile can specify one or more allowed landing pages for ad spaces of an ad space inventory. For instance, the ad profile can specify for a creative that only web pages belong to the creative's seller are allowed landing pages. A creative can be served to ad spaces of the ad space inventory if the creative's landing page belongs to the allowed landing pages. The ad profile can also specify prohibited behaviors of a creative's landing page. For instance, prohibited behaviors of a creative's landing page can be that the landing page having no content, the landing page's content being unrelated to the creative's buyer or brand, or the landing page being only accessible from a mobile device.

An ad profile can specify one or more creative buyers (or brands) that are allowed for ad spaces in an ad space inventory. For instance, the ad profile can specify allowed buyers (or brands) as only buyers that already have existing agreement with the ad space inventory's seller. As for another example, the ad profile can allow all buyers (or brands) except buyers representing competitors to the ad space inventory's seller. A creative can be served to ad space of the ad space inventory if the creative's buyer (or brand) belongs to the specified buyers (or brands).

Ad profiles can be implemented as data objects and stored in the ad profiles database 138, for example. Sellers can access the server system 122 (e.g., through a web page, or an application program interface or API) to create, update, or remove ad profiles stored in the ad profiles database 138. A global ad profile (e.g., implemented as a data object) can be stored in the ad profile database 138 for specifying standard conditions for creatives processed by the transaction manager 112. For instance, the global ad profile can specify conditions that are preferred by most ad sellers (e.g., publishers) such as prohibiting creatives with gambling related content. As for another example, the global ad profile can specify that the only allowable creative media type is image, since image creatives, as compared to rich-media creatives, can be less intrusive in users' perception and require less network bandwidth to transmit.

When the transaction manager 112 receives a bid on an ad space from a seller, the transaction manager 112 identifies attributes of the bid's creative, and determines whether the attributes satisfy conditions specified by the global ad profile or the seller's ad profile. The attributes of the bid's creative can be included in the bid, for example. In various implementations, the bid's buyer has previously registered the creative with the server system 122 (e.g., through a web page or API provided by the server system 122). The server system 122 stored attributes of the creative in the creative data database 137 and provided the buyer a unique identifier for the creative. When transaction manager 112 received the bid including the unique identifier, the transaction manager 112 can access the creative data database 137 (based on the unique identifier), and identify attributes of the bid's creative.

After identifying attributes of the bid's creative, the transaction manager 112 accesses the ad profiles database 138 for the global ad profile and determine whether the attributes satisfies conditions specified in the global ad profile. The transaction manager 112 also accesses the ad profiles database 138 for the seller's ad profile (if any) for an ad space inventory including the ad space. The transaction manager 112 determines whether the attributes of the bid's creative satisfies conditions specified by the seller's ad profile. The transaction manager 112 allows the bid's creative to sever the ad space when the creative's attributes satisfies conditions specified by the global ad profile or the seller's ad profile. For instance, the transaction manager 112 can allow the bid's creative to serve the ad space if the creative attributes satisfy conditions specified by both the global ad profile and the seller's ad profile. In various implementations, the transaction manager 112 can allow the bid's creative to server the ad space when the creative's attributes satisfy the seller's ad profile but do not satisfy one or more conditions specified by the global ad profile. That is, the transaction manager 112 allows the seller's ad profile to overwrite the global ad profile, as will be further described later.

A seller can negotiate with a buyer and reach an agreement on pricing or other terms on an ad space inventory of the seller. The seller can create (e.g., through an API or a web page provided by the server system 122) a deal (e.g., implemented as a data object) for the agreement and store the deal in the deals database 139. A deal stored in the deals database 139 can include an identifier for seller, an identifier for a buyer, an identifier for the deal, an identifier of an ad space inventory of the seller, and a floor price for an ad space in the ad space inventory. The floor price specifies a minimal bid price for the buyer. The deal can also include flight dates (start and ending dates for the deal), one or more user target segments, and an auction type. The auction type specifies whether the deal is private or public. For the private auction type, auctions for ad spaces of the deal are open only to buyers having agreements with the seller on the deal's corresponding ad space inventory. For the public auction type, auctions for ad spaces of the deal are open to every eligible buyer and not limiting to buyers having agreements with the seller on the deal's corresponding ad space inventory.

Since a deal's seller already has a preexisting agreement with the deal's buyer, the seller can instruct the server system 122 (e.g., the transaction manager 112) to, when processing the seller's creatives, skip examining the seller's creatives against the global ad profile stored in the ad profiles database 138. For instance, the global ad profile can specify prohibited content types (e.g., gambling) and one allowable creative media type in the image media type. Since the seller already has the preexisting agreement with the buyer and trusts the buyer's actions, it is not necessary for the server system 122 to determine whether the seller's creatives do not belong to the prohibited content types specified in the global ad profile. The seller can also instruct the server system 122 to skip examining whether the seller's creatives belong to the image media type specified by the global ad profile and, additionally, charge the seller a premium for the seller's rich-media creatives (which media type is different from the image media type specified by the global ad profile).

Figure 2:
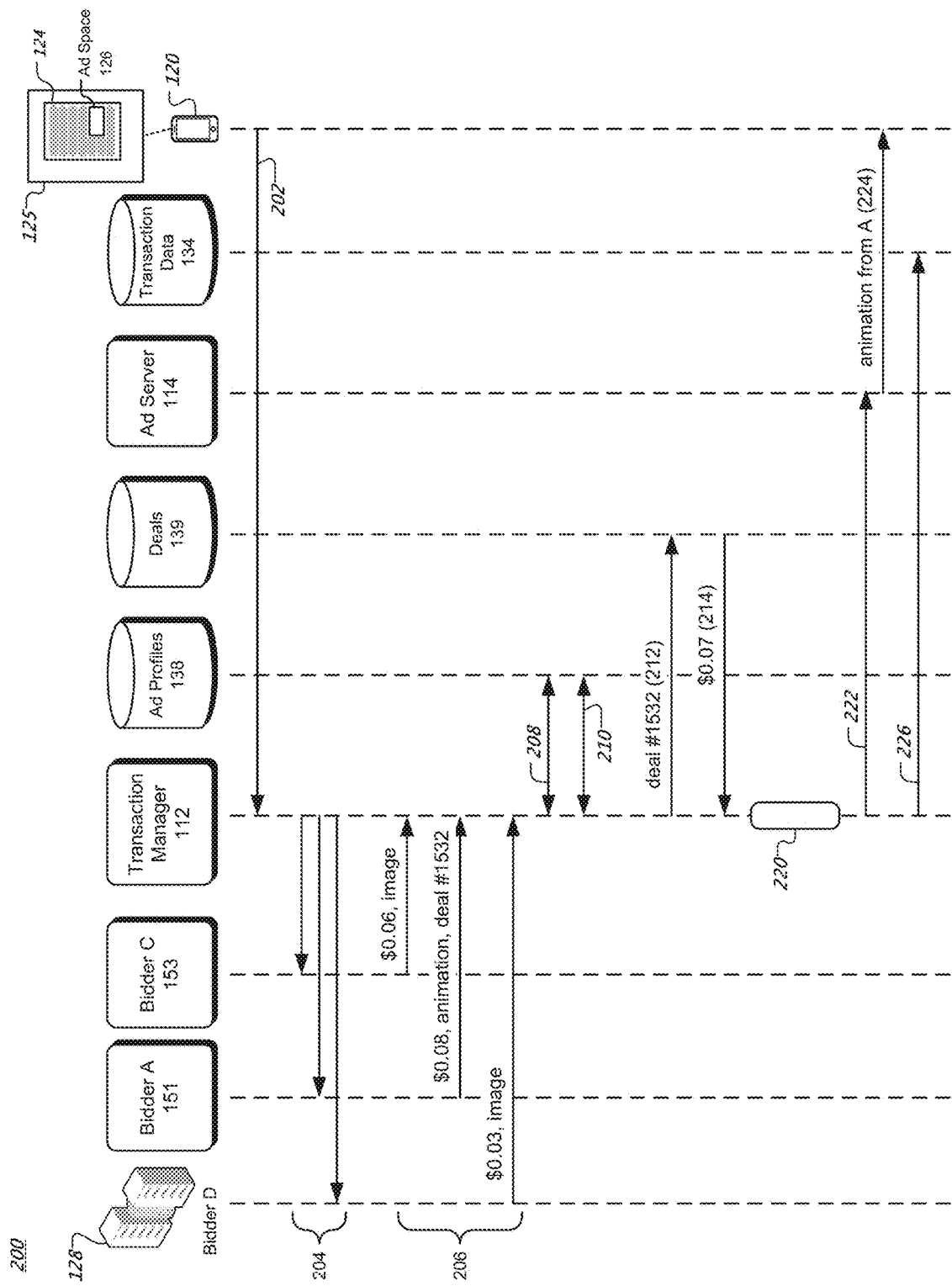
FIG. 2 is a data flow diagram of an example method for real-time online auction based on creative media type.

FIG. 2 is a data flow diagram of an example method for real-time online auction based on creative media type. In FIG. 2, the transaction manager 112 receives, from the client 120, an ad request (202) for an ad space 126 that is presented in the user interface 124. Here, the ad space is part of an ad space inventory of a seller. The transaction manager 112 sends a bid request (204) requesting for a bid on the ad space to bidders, for example, bidder A (e.g., representing buyer A), bidder C (e.g., representing buyer C), and bidder D (e.g., representing buyer D). Bidders A, C, and D send respective bids back to the transaction manager 112 (206). Each bid includes a respective bid price, buyer, and creative. Each bid may also include a respective deal (if any) between the respective buyer and the seller.

Here, assume that the bid from buyer C has a bid price of $0.06 (CPM), an image creative, and no existing deal with the seller. The bid from buyer A has a bid price of $0.08 (CPM), an animation creative, and an existing deal (with a corresponding deal identifier #1532). The bid from buyer D has a bid price of $0.03 (CPM), an image creative, and no existing deal with the seller.

To examine ad quality of the creatives from the buyers, the transaction manager 112 access the ad profiles database 138 (208) for the global ad profile that specifies one or more standard conditions for creative processed by the transaction manager 112. The transaction manager 112 also access the ad profile database 138 (210) for the seller's ad profile that specifies one or more conditions for the ad space inventory including the ad space 126 being auctioned by the transaction manager 112.

The transaction manager 112 also accesses the deals database 139 based on the deal identifier (#1532) for the deal between buyer A and the seller (212), and obtains a floor price $0.07 (CPM) for the deal that buyer A and the seller has previously agreed upon (214).

By way of illustration, assume that the global ad profile specifies the allowable creative media type is image. Assume that the seller's ad profile specifies that both image and rich-media creative media types are allowable, if a bid's buyer has an existing deal with the seller and the bid's bid price meets a floor bid price of the existing deal.

Given the global ad profile only, the transaction manager 112 does not select the bid from buyer A since the bid's creative (an animation) is not of the image creative media type, even that the bid's bid price is highest among the three bids. The transaction manager 112 would select the next highest bid from buyer C ($0.06), and cause the image creative from buyer C to be served to the ad space. However, since buyer A has a deal (deal #1532) with the seller, and buyer A's bid price ($0.08) meets and exceeds the deal's floor bid price ($0.07), the transaction manager 112 selects the buyer A's bid as the winning bid (220). That is, the transaction manager 112, based on the seller's ad profile and the existing deal between the seller and buyer A, automatically overwrites the global ad profile for this particular bid from buyer A. The transaction manager 112 automatically overwrites the global ad profile for this particular bid from buyer A "on the fly" during auctioning the ad space 126 in real time, without user manual input or interruption from the seller or buyer A.

After selecting buyer A's bid as the winning bid, the transaction manager 112 sends a message to the ad server 114 (222) and instructs the ad server to serve the buyer A's creative to the ad space. The ad server 114 sends the buyer A's creative to the client device 120 to be presented in the user interface 124 (224). The transaction manager 112 also stores in the transaction data database 134 a transaction record including the seller, the buyer A, and the buyer A's bid price $0.08—i.e., the transaction price (226). The buyer A will pay the transaction price to the seller for winning the bid on the ad space. In some implementations, the transaction manager 112 uses the second-highest bid price ($0.06) as the transaction price for this transaction record based on a second-price auction rule. A second-price auction rule such as Vickrey auction encourages bidders to submit true-valued bids. Other auction rules are possible.

As described earlier, the global ad profile and a seller's ad profile can each specify one or more conditions that allow or prohibit a creative to be served to an ad space. The conditions can be based on attributes such as creative media type, dimensions, content type, content language, landing page, buyer, and brand. In the example of FIG. 2 above, the seller A's ad profile overwrites the global ad profile in the condition related to the creative media type attribute. In some implementations, a seller's ad profile can overwrite some but not all conditions specified by the global ad profile. In this case, the transaction manager 112 determines whether a creative satisfies conditions of the global ad profile that are not overwritten by the seller's ad profile, and whether the creative satisfies all conditions specified by the seller's ad profile.

In other implementations, a seller's ad profile can overwrite all conditions specified by the global ad profile. In this case, the transaction manager 112 determines whether a creative satisfies conditions specified by the seller's ad profile, and does not determine whether the creative satisfies conditions specified by the global ad profile.

Figure 3:
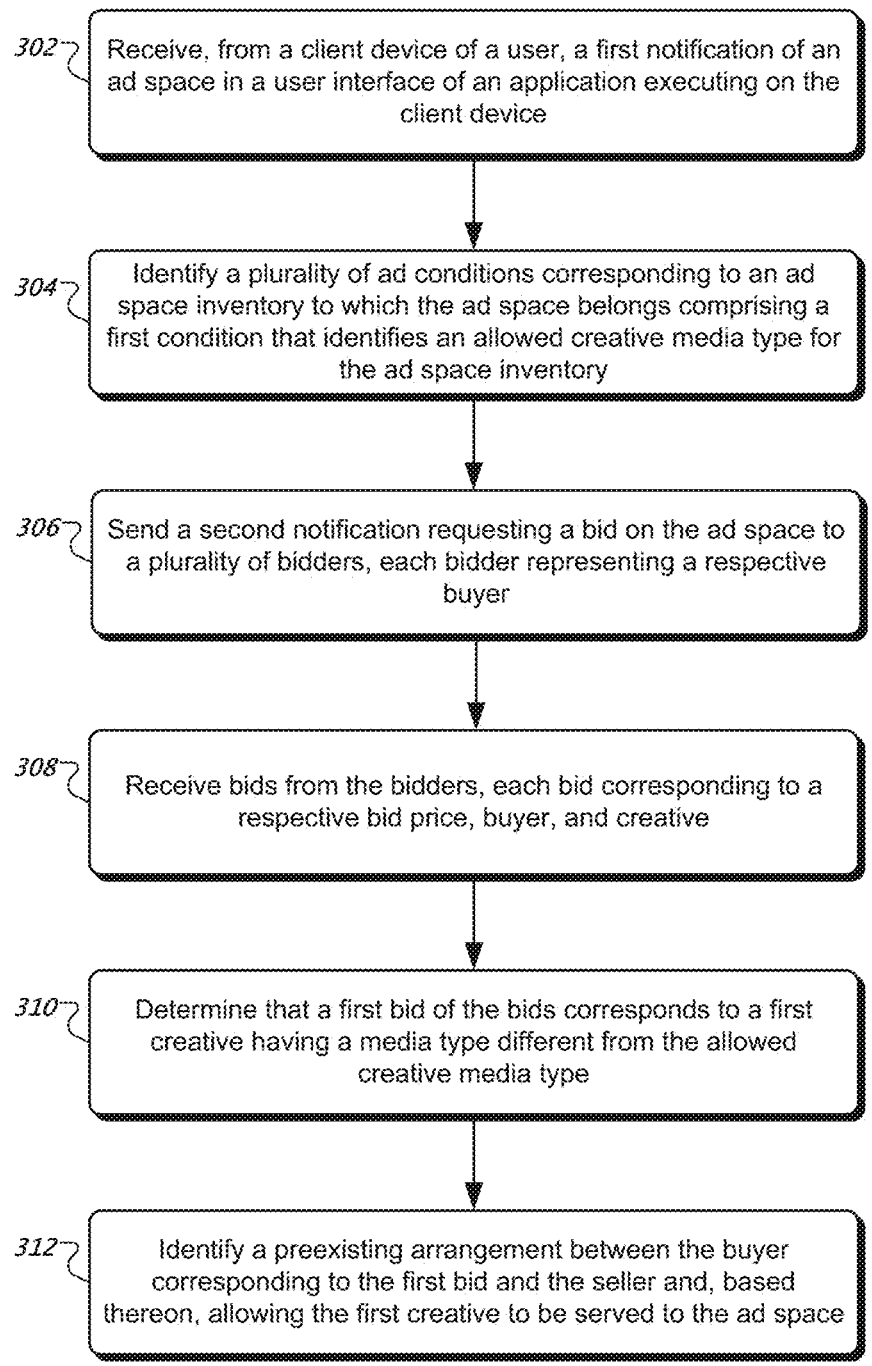
FIG. 3 is a flowchart of an example method for real-time online auction based on creative media type.

FIG. 3 is a flowchart of an example method for real-time online auction based on creative media type. The method can be implemented using software components executing on one or more data processing apparatus that are part of the data center 121 described earlier. The method begins by receiving, from a client device, a first notification of an ad space from a seller, the ad space being for presentation in a user interface of an application executing on the client device (302). The method identifies a plurality of ad conditions corresponding to an ad space inventory to which the ad space belongs comprising a first condition that identifies an allowed creative media type for the ad space inventory (304). The method sends a second notification requesting a bid on the ad space to a plurality of bidders, each bidder representing a respective buyer (306). The method receives bids from the bidders, each bid corresponding to a respective bid price, buyer, and a creative (308). The method determines that a first bid of the bids corresponds to a first creative having a media type different from the allowed creative media type (310). The method identifies a preexisting arrangement between the buyer corresponding to the first bid and the seller and, based thereon, allowing the first creative to be served to the ad space (312).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
performing by one or more computers:
receiving, by a processing system including a processor, from a client device, a first notification of an ad space from a seller over a communication network, the ad space being for presentation in a user interface of an application executing on the client device;
identifying, by the processing system, a first creative for the ad space;
identifying, by the processing system, a first plurality of ad conditions in a global ad profile corresponding to an ad space inventory to which the ad space belongs comprising a first condition that identifies an allowed creative media type for the ad space inventory, wherein the allowed creative media type comprises a fixed image, an expandable image, an animation, video, or audio, wherein the allowed creative media type comprises a first subject matter;
identifying, by the processing system, a second plurality of ad conditions in a seller's ad profile corresponding to the seller;
sending, by the processing system, a second notification requesting a bid on the ad space to a plurality of bidders over the communication network, each bidder representing a respective buyer;
receiving, by the processing system, bids from the bidders over the communication network, each bid corresponding to a respective bid price, buyer, and a creative;
determining, by the processing system, that a first bid of the bids corresponds to the first creative having a media type comprising a second subject matter different from the first subject matter, wherein the media type of the first creative comprises a fixed image, an expandable image, an animation, video, or audio;
identifying, by the processing system, a preexisting arrangement between a first buyer corresponding to the first bid and the seller, wherein the preexisting arrangement and the second plurality of ad conditions take priority over the first plurality of ad conditions in the global ad profile, wherein the preexisting arrangement and the second plurality of ad conditions allow the first creative to be served to the ad space, wherein the client device receives a uniform resource locator (URL) for the first creative over the communication network, wherein the client device obtained the first creative over the communication network according to the URL and presents the first creative on the ad space on a graphical user interface (GUI), wherein the preexisting arrangement includes a floor price between the first buyer and the seller;
determining, by the processing system, that the first creative does not satisfy the first plurality of ad conditions based on the first creative not comprising the allowed creative media type;
determining, by the processing system, that the first creative does satisfy the second plurality of ad conditions;
determining, by the processing system, that a first bid price of the first bid exceeds the floor price;
selecting, by the processing system, the first creative for the ad space based on the second plurality of ad conditions taking priority over the first plurality of ad conditions and the first bid price exceeding the floor price; and storing, by the processing system and based on the selecting of the first creative for the ad space, a transaction record that includes the seller, the first buyer, and a second bid price of a second bid included in the bids, wherein the second bid price corresponds to a second buyer that is different from the first buyer and the second bid price is different from the first bid price.

2. The method of claim 1, wherein allowing the first creative to be served to the ad space further comprises:
identifying, by the processing system, a second condition of the second plurality of ad conditions; and
determining, by the processing system, that one or more attributes of the first creative satisfies the second condition and, based thereon, allowing the first creative to be served to the ad space.

3. The method of claim 2, wherein the second condition specifies one or more requirements for creative dimensions, creative content type, creative content language, creative landing page, buyer, or brand.

4. The method of claim 3, wherein the second condition specifies creative dimensions and is satisfied if a size of the first creative fits within the creative dimensions.

5. The method of claim 3, wherein the second condition specifies allowed one or more creative content types and is satisfied if a content type of the first creative belongs to the allowed creative content types.

6. The method of claim 3, wherein the second condition specifies one or more allowed creative content languages and is satisfied if a content language of the first creative belongs to the allowed creative content languages.

7. The method of claim 3, wherein the second condition specifies one or more allowed landing pages and is satisfied if a landing page of the first creative belongs to the allowed landing pages.

8. The method of claim 3, wherein the second condition specifies one or more allowed buyers and is satisfied if the buyer of the first creative belongs to the allowed buyers.

9. The method of claim 3, wherein the second condition specifies one or more allowed brands and is satisfied if a brand of the first creative belongs to the allowed brands.

10. The method of claim 1, wherein the floor price is based on the media type of the first creative.

11. The method of claim 1, wherein the preexisting arrangement is specified for at least the ad space inventory to which the ad space belongs.

12. A system comprising:
a processing system including a processor of a mobile communication device; and
a memory that stores executable instructions that, when executed by the processing system, facilitate performance of operations, comprising:
receiving, from a client device, a first notification of an ad space from a seller over a communication network, the ad space being for presentation in a user interface of an application executing on the client device;
identifying a first creative for the ad space;
identifying a first plurality of ad conditions in a global ad profile corresponding to an ad space inventory to which the ad space belongs comprising a first condition that identifies an allowed creative media type for the ad space inventory, wherein the allowed creative media type comprises a fixed image, an expandable image, an animation, video, or audio, wherein the allowed creative media type comprises a first subject matter;
identifying a second plurality of ad conditions in a seller's ad profile corresponding to the seller;
sending a second notification requesting a bid on the ad space to a plurality of bidders over the communication network, each bidder representing a respective buyer;
receiving bids from the bidders over the communication network, each bid corresponding to a respective bid price, buyer, and a creative;
determining that a first bid of the bids corresponds to the first creative having a media type comprising a second subject matter different from the first subject matter, wherein the media type of the first creative comprises a fixed image, an expandable image, an animation, video, or audio;
identifying a preexisting arrangement between a first buyer corresponding to the first bid and the seller, wherein the preexisting arrangement and the second plurality of ad conditions take priority over the first plurality of ad conditions in the global ad profile, wherein the preexisting arrangement and the second plurality of ad conditions allow the first creative to be served to the ad space, wherein the client device receives a uniform resource locator (URL) for the first creative over the communication network, wherein the preexisting arrangement includes a floor price between the first buyer and the seller;
determining that the first creative does not satisfy the first plurality of ad conditions based on the first creative not comprising the allowed creative media type;
determining that the first creative does satisfy the second plurality of ad conditions;
determining that a first bid price of the first bid exceeds the floor price;
selecting the first creative for the ad space based on the second plurality of ad conditions taking priority over the first plurality of ad conditions and the first bid price exceeding the floor price; and
storing, based on the selecting of the first creative for the ad space, a record that includes the seller, the first buyer, and a second bid price of a second bid included in the bids, wherein the second bid price corresponds to a second buyer that is different from the first buyer and the second bid price is different from the first bid price.

13. The system of claim 12, wherein allowing the first creative to be served to the ad space further comprises:
identifying a second condition of the second plurality of ad conditions; and
determining that one or more attributes of the first creative satisfies the second condition and, based thereon, allowing the first creative to be served to the ad space.

14. The system of claim 13, wherein the second condition specifies one or more requirements for creative dimensions, creative content type, creative content language, creative landing page, buyer, or brand.

15. The system of claim 14, wherein the second condition specifies creative dimensions and is satisfied if a size of the first creative fits within the creative dimensions.

16. The system of claim 14, wherein the second condition specifies allowed one or more creative content types and is satisfied if a content type of the first creative belongs to the allowed creative one or more content types.

17. The system of claim 12, wherein the floor price is based on the media type of the first creative.

18. A non-transitory machine-readable storage medium, comprising executable instructions that, when executed by a processor, facilitate performance of operations, comprising:

receiving, from a client device, a first notification of an ad space from a seller over a communication network, the ad space being for presentation in a user interface of an application executing on the client device;

identifying a first creative for the ad space;

identifying a first plurality of ad conditions in a global ad profile corresponding to an ad space inventory to which the ad space belongs comprising a first condition that identifies an allowed creative media type for the ad space inventory, wherein the allowed creative media type comprises a fixed image, an expandable image, an animation, video, or audio, wherein the allowed creative media type comprises a first subject matter;

identifying a second plurality of ad conditions in a seller's ad profile corresponding to the seller;

sending a second notification requesting a bid on the ad space to a plurality of bidders over the communication network, each bidder representing a respective buyer;

receiving bids from the bidders over the communication network, each bid corresponding to a respective bid price, buyer, and a creative;

determining that a first bid of the bids corresponds to the first creative having a media type comprising a second subject matter different from the first subject matter, wherein the media type of the first creative comprises a fixed image, an expandable image, an animation, video, or audio identifying a preexisting arrangement between a first buyer corresponding to the first bid and the seller, wherein the preexisting arrangement and the second plurality of ad conditions take priority over the first plurality of ad conditions in the global ad profile, wherein the preexisting arrangement and the second plurality of ad conditions allow the first creative to be served to the ad space, wherein the preexisting arrangement includes a floor price between the first buyer and the seller;

determining that the first creative does not satisfy the first plurality of ad conditions based on the first creative not comprising the allowed creative media type;

determining that the first creative does satisfy the second plurality of ad conditions;

determining that a first bid price of the first bid exceeds the floor price;

selecting the first creative for the ad space based on the second plurality of ad conditions taking priority over the first plurality of ad conditions and the first bid price exceeding the floor price; and storing, based on the selecting of the first creative for the ad space, a record that includes the seller, the first buyer, and a second bid price of a second bid included in the bids, wherein the second bid price corresponds to a second buyer that is different from the first buyer and the second bid price is different from the first bid price.

19. The non-transitory machine-readable storage medium of claim 18, wherein the second bid price is less than the floor price.

20. The non-transitory machine-readable storage medium of claim 18, wherein the operations further comprise:

selecting the second bid price for the record based on determining that the second bid price is greater than a third bid price of a third bid included in the bids.

\* \* \* \* \*